Patented Oct. 21, 1952

2,614,979

UNITED STATES PATENT OFFICE 2,614,979

DRILLING FLUID

William M. Hutchinson, Bartlesville, Okla., assignor to Phillips Petroleum Company, a corporation of Delaware No Drawing. Application August 18, 1947, Serial No. 769,310

17 Claims. (Cl. 252—8.5)

This invention relates to drilling fluids. In one of its more specific aspects it relates to organic base derivatives of cellulosic compounds and their use as drilling mud additives.

In the art of drilling wells to tap subterranean deposits of fluids, especially when drilling by the rotary method, it is necessary to use a drilling fluid, as is well known by those skilled in such art. The especially prepared drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension all solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole.

These requirements have in the past been met by making a dispersion in water of suitable dissolved and suspended solids of such type and in such concentration that satisfactory weight and consistency, and necessary colloid properties, especially solid-suspension and plastering properties, are established.

Aqueous drilling muds are ordinarily made by dispersing in water a quantity of bentonitic clay and a quantity of a weighting material such as finely ground barytes, barium carbonate, iron oxide or lead sulfide. These latter materials are used for the sole purpose of increasing the weight of the drilling fluid per unit of volume, or in other words to increase the pressure exerted on the walls and in the bottom of the well.

Drilling muds have been prepared and used which weigh 9, 10, 11, or 12 pounds per gallon or even more. Such weights as these are quite large as compared to the weight of a gallon of water, which is 8⅓ pounds. In order to hold such quantities of weighting materials in suspension in a fluid, it was found necessary to add considerable quantities of bentonitic clay. Bentonite possessed one undesired property, that is, it markedly increased the viscosity of the drilling fluid. When relatively large quantities of bentonite were used the muds frequently became so viscous that excessive power was required to circulate the mud.

A distinct step forward was made when it was learned that upon addition of an alkali, such as sodium hydroxide containing quebracho, the weighted bentonitic mud became relatively fluid. In other words the viscosity had been markedly decreased. It was found, however, that the decrease in viscosity of the mud was accompanied by the inability of the mud to hold in suspension well cuttings in the well upon stopping of circulation.

Another disadvantage of such muds was that as depth of drill hole increased and the hydrostatic pressure of the mud in lower portion of the hole became greater, excessively large amounts of water were forced in the surrounding formations. The thickness of the layer of plastering material deposited on the walls was roughly proportionate to the water loss. In other words both water and wall building materials were lost. Such losses increased the cost of well drilling operations.

One object of my invention is to provide an improved drilling fluid.

Another object of my invention is to provide a drilling fluid which overcomes the above mentioned disadvantages.

Still another object of my invention is to provide an aqueous drilling mud which has a relatively low viscosity and yet possesses power to remove well cuttings from the well and at the same time to permit the cuttings to drop out upon reaching the surface of the ground.

Yet another object of my invention is to provide an aqueous drilling mud capable of carrying well cuttings from the well and dropping them out in the pit and at the same time being able to hold the cuttings in suspension in the well when circulation of the drilling fluid has stopped for any reason whatever.

And another object of my invention is to provide an improved drilling fluid and a method for using this improved fluid.

I accomplish these and other objects by adding to aqueous drilling fluids certain compounds resulting from the interaction of strong organic bases and certain cellulosic acids.

One substance I prefer to employ as an acidic cellulosic material is carboxymethylcellulose. It is also called carboxymethylcellulose ether, carboxymethyl cellulose, carboxymethyl cellulose ether and CMC, which with carboxymethylcellulose mean one and the same compound.

I have found that strong organic base compounds, such as triethanolamine, will react with carboxyalkylcellulose, such as carboxymethylcellulose ether (free acid), in the presence of water to form a complex salt which when added to an aqueous drilling mud imparts desirable properties thereto. A base mud which had a viscosity of 13.5 centipoises as measured by a Stormer viscosimeter, after addition of 1 pound per barrel of the above mentioned reaction product, possessed a viscosity of 28.5 centipoises. The base mud had a 30 minute water loss at 100 pounds pressure of 30 milliliters, the mud containing the reaction product had a water loss of only 9.5 milliliters. The thickness of the filter cake indicated that the treated mud possessed good plastering or wall building properties.

PREPARATION OF THE ORGANIC BASE SALT

Triethanolamine-CMC salt

Taking triethanolamine as exemplary of a strong organic base, the following procedure was followed in making that cellulosic derivative of this base. A small amount of water was added to a given quantity of ethanolamine and to this concentrated solution an amount of carboxymethylcellulose (free acid) somewhat less than equivalent to the base was added. The amine dissolved and reacted with the CMC acid rather slowly. When the solution became clear and viscous the reaction was considered sufficiently near complete for test purposes.

A large quantity of acetone was added to precipitate the ethanolamine-CMC compound. The precipitate was filtered, washed with acetone, redissolved in water and again precipitated by acetone, washed with acetone and dried. The product was dried in a vacuum over $P_2O_5$ and ground in a Wiley laboratory mill.

Ethylenediamine-CMC salt

A quantity of carboxymethylcellulose (free acid) was reacted with an excess of ethylenediamine in a water solution. Since these two materials reacted rather rapidly, heat of neutralization was evolved and rapidly warmed the reaction solution. Sufficient water was added to prevent overheating.

When the reaction was considered completed, a large amount of acetone was added to precipitate the reaction product, which was filtered from the solution and washed with acetone. This precipitate was dispersed in water, reprecipitated with acetone, filtered and washed with acetone. The sample was dried over $P_2O_5$ in vacuo and ground in a Wiley laboratory mill.

Morpholine-CMC salt

A quantity of carboxymethylcellulose (free acid) was reacted with an excess of morpholine in an aqueous solution. Reaction was fairly rapid as evidenced by the spontaneous warming of the solution by the heat of neutralization.

The reaction product was precipitated by acetone, filtered and washed with acetone. The precipitate was dispersed in water, reprecipitated with acetone, filtered and washed with acetone and dried over $P_2O_5$ in vacuo. The dried material was ground in a Wiley laboratory mill.

In each of these three preparations an excess of the organic base was used in an attempt to convert as nearly completely as possible the acid CMC to the complex organic-CMC salt. The double precipitation was intended to free the desired compound from the unreacted base as well as from any other impurity which might be present. However, the acetone treatment will precipitate any unreacted CMC (acid) and this unreacted material will be present as a contaminant in each of the finally dried and ground organic base-CMC products.

A 1%[1] aqueous solution or suspension of each of these prepared compounds was made and tested for viscosity, pH and gel content, the results of which are as follows:

|  | Viscosity, cpe. at 25° C. | Ml. gel from 10 ml. of solution | pH |
|---|---|---|---|
| Triethanolamine-CMC salt | 26.0 | trace | 5.9 |
| Ethylenediamine-CMC salt | 9.8 | 0.1 | 7.0 |
| Morpholine-CMC salt | 9.0 | 0.0 | 6.1 |

These materials were tested in laboratory prepared drilling muds of the following composition: a native West Texas clay 8.1%, bentonite 0.8%, $BaSO_4$ 26.3%, $BaCO_3$ 0.8% and water 64%.

This base mud possessed the following properties, after 250 ml. of mud were diluted with 50 ml. water:

```
                                          Base mud
Viscosity, cpe. ------------------------- 13.5
Initial gel, g. -------------------------- 18
10 minute gel, g. ------------------------ 40
Water loss, ml. -------------------------- 30
pH --------------------------------------- 9.2
```

The required amounts of each organic base-CMC salt to make 1, 2, 3 and 4 pounds per barrel were weighed out and dispersed in 50 ml. of water then added to 250 ml. of the base mud. The mud samples containing the cellulosic additives were stirred for 30 minutes with a high speed laboratory mixer and allowed to stand over night, then again stirred for 30 minutes before testing.

TESTS

The tests of the properties of drilling muds as given herein were all made with standard drilling mud equipment.

The pH determinations were made with a Beckmann pH meter, Model G. The viscosity measurements were made with a Stormer viscosimeter and reported in centipoise units. The organic base-cellulose compounds were mixed with the drilling mud samples with the aid of a high speed laboratory mixer such as a Hamilton-Beach No. 33 high speed mixer.

The water losses were determined with an A. P. I. low pressure wall building tester filter press with a pressure of 100 pounds per square inch applied for 30 minutes. The initial and 10 minute gels were determined with the aid of the same Stormer viscosimeter as was used in the determination of the viscosity.

[1] These solutions were made by dispersing 1 gram of the organic base-CMC salt in 100 ml. of water.

The test results of the treated mud are as follows:

| Pounds per barrel | Viscosity, cpe. | | | | Gel strength | | | | | | | |
|---|---|---|---|---|---|---|---|---|---|---|---|---|
| | | | | | Initial | | | | 10 minute | | | |
| | 1 | 2 | 3 | 4 | 1 | 2 | 3 | 4 | 1 | 2 | 3 | 4 |
| Triethanolamine-CMC salt | 28.5 | 69 | 97.5 | 100 | 2 | 5 | 5 | 7 | 22 | 25 | 40 | 75 |
| Ethylenediamine-CMC salt | 23.5 | 52 | 75 | 101.5 | 2 | 3 | 5 | 7 | 15 | 17 | 25 | 50 |
| Morpholine-CMC salt | 25.5 | 52 | 74 | 103 | 0 | 1 | 4 | 5 | 0 | 5 | 10 | 12 |

| Pounds per barrel | 30 min. Water Loss | | | | pH of filtrate | | | |
|---|---|---|---|---|---|---|---|---|
| | 1 | 2 | 3 | 4 | 1 | 2 | 3 | 4 |
| Triethanolamine-CMC salt | 9.5 | 6.5 | 6.0 | 4.5 | 8.7 | 8.6 | 8.5 | 8.3 |
| Ethylenediamine CMC salt | 10.5 | 7.0 | 6.2 | 5.5 | 8.8 | 8.9 | 8.7 | 8.9 |
| Morpholine-CMC salt | 7.5 | 7.0 | 5.5 | 5.0 | 8.9 | 8.5 | 8.7 | 8.7 |

By comparison of the untreated drilling mud sample with the treated samples it will be seen that the organic base-CMC derivatives were very effective treating agents. For example, any additive which possesses the power to decrease the water loss from 30 ml. to 6.5 or 6.0 ml. upon addition of 2 or 3 pounds additive, respectively, per barrel of mud is a remarkable treating agent as will be realized by those skilled in this art.

The compounds tested imparted very low initial gel strength and somewhat higher 10 minute gel strength to the mud, which properties are prerequisites of a good mud additive.

In testing the hereindisclosed additives in a drilling mud, 1, 2, 3, and 4 pounds additives per barrel of mud were used. From the test data for 1 pound additive per barrel it is obvious that less additive could have been used and yet obtain beneficial results. For example, consider the triethanolamine-CMC salt. The additive of 1 pound per barrel of this material increased the viscosity from 13.5 cpe. on the base mud to 28.5 cpe., while the initial gel strength was decreased from 18 g. to 2 g., and the 10 minute gel strength also was decreased from 40 g. to 22 g. The use of ½ or even ¼ pound per barrel would have undoubtedly had an appreciable or at least a proportionately smaller effect on the mud than did the 1 pound per barrel. Even this proportionately smaller effect would be very advantageous as can be appreciated by one skilled in the art.

The upper limit on amounts of treating agents may be determined by economic considerations as well as by physical data. Four pounds of these additives per barrel quite appreciably raised the viscosity of the mud, as did even 3 pounds per barrel. Such viscosities are quite high and it is preferred to use muds having lower viscosities or to treat such high viscosity muds to effect a reduction in viscosity.

Accordingly I prefer to define limits of amounts of additives to use in drilling muds by function rather than by actual numerical limits, the amount to be used being that necessary to give the result desired.

Other organic bases than those described above may be used for reacting with carboxyalkylcelluloses (free acids) or other cellulosic acids for the preparation of drilling mud additives as herein disclosed. Amines are alkaline reacting compounds and such amines as are sufficiently alkaline or sufficiently strong bases to react with the cellulosic acids are, in general, suitable for the preparation of the drilling mud additives as herein disclosed.

As mentioned, alkyl amines, whether they are normal, or iso, dialkyl or trialkyl amines is immaterial, provided they are sufficiently strong bases. Quaternary ammonium bases may be used, as tetramethyl ammonium hydroxide, or cyclic substituted bases, as benzyl trimethyl ammonium hydroxide, or other cyclic or aromatic derivatives.

Ethanolamines, mono-, di- or tri- may be used.

Aromatic amines, such as aniline, phenylene diamine, or diphenylamine, etc., may be used.

Heterocyclic compounds, such as morpholine, as hereinabove described, or pyridine, piperidine (hydrogenated pyridine), substituted pyridines, as the picolines, lutidines, or collidines, or derivatives thereof which are sufficiently strong bases may be used.

Other types of organic compounds such as iodonium hydroxides, for example, dimethyl iodonium hydroxide, or benzyl methyl iodonium hydroxide, may be used to prepare cellulosic additives for muds.

Sulfonium hydroxides, such as triethyl sulfonium hydroxide may likewise be used, provided such compounds are sufficiently strong bases to react with the acidic cellulosic compounds as herein disclosed.

The cellulosic acid material to be used with the strong organic bases may be an oxycellulose acid, cellulose sulfate acid, cellulose alkyl sulfonate acids as well as the free acids of the carboxyalkylcellulose ethers. Of this latter type of acidic compounds carboxymethylcellulose ether, carboxyethylcellulose ether and carboxypropylcellulose ether may be mentioned.

Such cellulosic acids as hereinabove mentioned will react or be neutralized by strong organic bases to form organic base-cellulosic compounds which are useful in treating drilling muds.

Exactly what reaction takes place when the herein disclosed strong organic bases react with the above mentioned acidic cellulosic materials is not definitely understood. I have found, however, that the product from the reaction of these acids with these bases are useful as drilling mud additives.

It will be obvious to those skilled in the art that many alterations and variations in the base-acid reacting conditions, in drilling mud compositions, etc., may be made and yet remain within the intended spirit and scope of my invention.

I claim:

1. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthern formations which comprises admixing with said drilling mud and interacting therewith a water dispersible reaction product of a strong organic base with an acidic cellulosic compound selected from the group consisting of oxycellulose, carboxymethylcellulose ether, carboxyethylcellulose ether, carboxypropylcellulose ether, cellulose acid sulfate, and cellulose acid sulfonate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

2. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water dispersible reaction product of a strong organic base with carboxymethylcellulose ether in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

3. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprise admixing with said drilling mud and interacting therewith a water dispersible reaction product of a strong nitrogen-containing organic base with an acidic cellulosic compound selected from the group consisting of oxycellulose, carboxymethylcellulose ether, carboxyethylcellulose ether, carboxypropylcellulose ether, cellulose acid sulfate, and cellulose acid sulfonate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

4. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water dispersible reaction product of a strong nitrogen-containing organic base with carboxymethylcellulose ether in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

5. A water base drilling mud comprising in combination sufficient water to maintain the mud as a fluid, sufficient clayey material to form a filter cake on the wall of the well, and a water dispersible reaction product of a strong organic base with an acidic cellulosic compound selected from the group consisting of oxycellulose, carboxymethylcellulose ether, carboxyethylcellulose ether, carboxypropylcellulose ether, cellulose acid sulfate, and cellulose acid sulfonate in an amount sufficient to reduce the water loss due to filtration through said filter cake without increasing the viscosity of said well drilling mud to such an extent that it cannot be circulated.

6. A water base drilling mud comprising in combination sufficient water to maintain the mud as a fluid, sufficient clayey material to form a filter cake on the wall of the well, and a water dispersible reaction product of a strong organic base with carboxymethylcellulose ether in an amount sufficient to reduce the water loss due to filtration through said filter cake without increasing the viscosity of said well drilling mud to such an extent that it cannot be circulated.

7. A water base drilling mud comprising in combination sufficient water to maintain the mud as a fluid, sufficient clayey material to form a filter cake on the wall of the well, and a water dispersible reaction product of a strong nitrogen-containing organic base with an acidic cellulosic compound selected from the group consisting of oxycellulose, carboxymethylcellulose ether, carboxyethylcellulose ether, carboxypropylcellulose ether, cellulose acid sulfate, and cellulose acid sulfonate in an amount sufficient to reduce the water loss due to filtration through said filter cake without increasing the viscosity of said well drilling mud to such an extent that it cannot be circulated.

8. A water base drilling mud composition comprising in combination sufficient water to maintain the mud as a fluid, sufficient clayey material to form a filter cake on the wall of a well, and a water dispersible reaction product of a strong nitrogen-containing base selected from the group consisting of triethanolamine, ethylenediamine and morpholine and an acidic carboxymethylcellulose ether in an amount sufficient to reduce the water loss due to filtration through said filter cake without increasing the viscosity of said mud to such an extent that it cannot be circulated.

9. A water base well drilling mud comprising an aqueous fluid mixture containing suspended solids which form a filter cake on the wall of the well, and a water dispersible reaction product of a strong organic base with an acidic cellulosic compound selected from the group consisting of oxycellulose, carboxymethylcellulose ether, carboxyethylcellulose ether, carboxypropylcellulose ether, cellulose acid sulfate and cellulose acid sulfonate in an amount sufficient to reduce the water loss due to filtration through said filter cake without increasing the viscosity of said well drilling mud to such an extent that it cannot be circulated.

10. A water base well drilling mud comprising an aqueous fluid mixture containing suspended solids which form a filter cake on the wall of the well, and a water dispersible reaction product of a strong organic base with cellulose acidic sulfate in an amount sufficient to reduce the water loss due to filtration through said filter cake without increasing the viscosity of said well drilling mud to such an extent that it cannot be circulated.

11. A water base well drilling mud comprising an aqueous fluid mixture containing suspended solids which form a filter cake on the wall of the well, and a water dispersible reaction product of a strong nitrogen containing organic base with oxycellulose in an amount sufficient to reduce the water loss due to filtration through said filter cake without increasing the viscosity of said well drilling mud to such an extent that it cannot be circulated.

12. A water base well drilling mud comprising an aqueous fluid mixture containing suspended solids which form a filter cake on the wall of the well, and a water dispersible reaction product of a strong nitrogen-containing organic base cellulose acid sulfate in an amount sufficient to reduce the water loss due to filtration through said filter cake without increasing the viscosity of said well drilling mud to such an extent that it cannot be circulated.

13. A drilling mud according to claim 9 wherein said strong organic base is triethanolamine.

14. A drilling mud according to claim 9 wherein said strong organic base is ethylenediamine.

15. A drilling mud according to claim 9 wherein said strong organic base is morpholine.

16. A drilling mud according to claim 9 wherein said strong organic base is aniline.

17. A drilling mud according to claim 9 wherein said strong organic base is pyridine.

WILLIAM M. HUTCHINSON.

REFERENCES CITED

The following references are of record in the file of this patent:

UNITED STATES PATENTS

| Number | Name | Date |
| --- | --- | --- |
| 2,129,913 | Cross et al. | Sept. 13, 1938 |
| 2,180,152 | Kohler | Nov. 14, 1939 |
| 2,294,877 | Wayne | Sept. 1, 1942 |
| 2,425,768 | Wagner | Aug. 19, 1947 |